United States Patent [19]

Neviani

[11] Patent Number: 5,895,322

[45] Date of Patent: *Apr. 20, 1999

[54] SLIDING UNIVERSAL JOINT HAVING AN ANTI-VIBRATION ASSEMBLY BETWEEN A SPHERICAL ROLLER AND A RUNWAY

[75] Inventor: Claude Neviani, Meulan, France

[73] Assignee: GKN Automotive AG, Lohmar, Germany

[*] Notice: This patent is subject to a terminal disclaimer.

[21] Appl. No.: 08/584,690

[22] Filed: Jan. 11, 1996

[30] Foreign Application Priority Data

Jan. 11, 1995 [FR] France ................... 95 00274

[51] Int. Cl.$^6$ ............................................. F16D 3/26
[52] U.S. Cl. .................. 464/111; 464/120; 464/167; 464/905
[58] Field of Search .......................... 464/111, 905, 464/122, 120, 167

[56] References Cited

U.S. PATENT DOCUMENTS

| | | | |
|---|---|---|---|
| 2,559,108 | 7/1951 | Boge, Sr. et al. | 64/8 |
| 2,898,749 | 8/1959 | Parkman | 64/8 |
| 3,381,497 | 5/1968 | Allen | 64/7 |
| 3,478,538 | 11/1969 | Heimler | 101/407 |
| 4,291,552 | 9/1981 | Orain | 64/21 |
| 4,582,501 | 4/1986 | Gibbons | 464/85 |
| 4,582,502 | 4/1986 | Girguis | 464/111 |
| 4,741,723 | 5/1988 | Orain | 464/111 |
| 4,828,534 | 5/1989 | Orain | 464/111 |
| 4,878,881 | 11/1989 | Van Dest | 464/111 |
| 4,881,923 | 11/1989 | Orain | 464/111 |
| 4,954,120 | 9/1990 | Kobayashi | 464/141 |
| 4,988,327 | 1/1991 | Orain | 464/111 |
| 5,019,016 | 5/1991 | Uchman | 464/111 |
| 5,061,223 | 10/1991 | Kadota et al. | 464/111 |
| 5,135,438 | 8/1992 | Poulin et al. | 464/111 |
| 5,184,978 | 2/1993 | Fillmore | 464/111 |
| 5,254,038 | 10/1993 | Schneider | 464/111 |
| 5,290,202 | 3/1994 | Orain | 464/111 |

FOREIGN PATENT DOCUMENTS

| | | |
|---|---|---|
| 0 206 886 | 6/1986 | European Pat. Off. . |
| 0 429 326 A1 | 10/1990 | European Pat. Off. . |
| 0 477 074 A1 | 9/1991 | European Pat. Off. . |
| 1 012 081 | 6/1949 | France . |
| 2 506 872 | 12/1982 | France . |
| 2 512 140 | 3/1983 | France . |
| 2 592 106 | 12/1986 | France . |
| 2 622 653 | 10/1987 | France . |
| 2 628 803 | 3/1988 | France . |
| 23 31 033 | 1/1975 | Germany . |
| 44 10 724 A1 A1 | 3/1994 | Germany . |
| 61-266830 | 11/1986 | Japan . |
| 63-92822 | 4/1988 | Japan . |
| 3-168416 | 7/1991 | Japan . |
| 5-321942 | 12/1993 | Japan . |
| 2 106 219 | 6/1982 | United Kingdom . |
| 2106219 | 4/1983 | United Kingdom ............ 464/111 |
| 2 199 113 | 6/1988 | United Kingdom . |
| 2 210 952 | 6/1989 | United Kingdom . |
| 2 236 164 | 3/1991 | United Kingdom . |
| WO91/16549 | 10/1991 | WIPO . |
| 92/1579 | 9/1992 | WIPO . |

Primary Examiner—Donald P. Walsh
Assistant Examiner—Emmanuel M. Marcelo
Attorney, Agent, or Firm—Wenderoth, Lind & Ponack, L.L.P.

[57] ABSTRACT a sliding universal joint has a male element (1), especially a tripod, intended to be fixed to a first shaft and including arms (6) on each of which a roller (3) with a spherical external surface is mounted so that it can rotate and slide. A female element (2) intended to be fixed to a second shaft and defines on each side of each spherical roller two runway paths (7,8). A first of these runway paths (7) interacts directly with the spherical roller and axially positionins it. Between each spherical roller (3) and the associated second runway path (8) there is interposed an anti-vibration assembly (4) which, on the inside, includes a spherical surface which substantially matches the external surface of the spherical roller and interacts with this surface. This assembly (4) moves along the second runway path (8).

14 Claims, 3 Drawing Sheets

SLIDING UNIVERSAL JOINT HAVING AN ANTI-VIBRATION ASSEMBLY BETWEEN A SPHERICAL ROLLER AND A RUNWAY

The present invention relates to a sliding universal joint of the type comprising a male element, especially a tripod, intended to be fixed to a first shaft and including arms on each of which a roller with a spherical external surface is mounted so that it can rotate and slide, and a female element intended to be fixed to a second shaft and defining on each side of each spherical roller two runway paths, a first of these runway paths interacting directly with the spherical roller and axially positioning it. The invention applies particularly to motor-vehicle transmissions.

In known joints of this type, each spherical roller runs directly along the two associated runway paths and it is observed that, under torque and at an angle, the joint creates periodic axial excitation which is transmitted to the structure of the vehicle. What is more, the joint is not good at filtering out vibration of the drive shaft.

Many efforts have been made to eliminate or at least to reduce these phenomena. Effective solutions have been proposed, but at the expense of increasing the complexity and the cost of the joints (see, for example, FR-A-2,506,872 and 2,628,803 in the name of the Applicant Company).

SUMMARY OF THE INVENTION

The object of the invention is to provide a sliding universal joint whose design, better suited to actual operating conditions, makes it possible, at a reduced cost, to obtain a similar result throughout virtually the entire lifetime of the joint.

To this end, the subject of the invention is a universal joint of the aforementioned type, characterized in that, between each spherical roller and the associated second runway path, there is interposed an anti-vibration assembly which on the inside includes a spherical surface which substantially matches the external surface of the spherical roller and interacts with this surface. The anti-vibration assembly moves along the said second runway path.

"Anti-vibration assembly" is understood to mean a mechanical assembly which has properties of free axial movement and/or of weak creation of axial excitations, which properties are better than those of a spherical roller interacting directly with the first runway path.

The universal joint according to the invention may include one or more of the following characteristics:

- the anti-vibration assembly comprises a bearing member and rolling members interposed between the external face of the bearing member and the second runway path;
- the second runway path is a groove with a circular cross-section, the bearing member is a strip, especially a self-recentering strip which, on the opposite, side from the spherical roller, exhibits at least one is track with the circular cross-section, and the rolling members consist of at least two balls which roll along this or these tracks and along the second runway path;
- the second runway path comprises at least two parallel grooves with circular cross-sections, the bearing member is a strip, especially a self-recentering strip which, on the opposite side from the spherical roller, exhibits at least two tracks with circular cross-sections, and the rolling members consist of at least two pairs of balls which run along these tracks, respectively, and along the second runway path;
- the four balls include a common diametral plane which is inclined with respect to the axis of the spherical roller or is parallel to this axis;
- the rolling members comprise rollers with axes parallel to the axis of the spherical roller, the bearing member is a strip, especially a self-recentering strip which, on the opposite side from the spherical roller, exhibits at least one track, and this or these tracks together with the second runway path have cross-sections which substantially match the external shape of the rollers;
- the bearing member is a pad which is plane on the opposite side from the spherical roller, the second runway path has a flat bottom, and the rolling members comprise a row of needles;
- the anti-vibration assembly comprises a toric segment, the internal surface of which interacts with the spherical roller and the external surface of which runs along the second runway path which has a circular cross-section substantially matching that of the external surface;
- the first runway path is defined by an arched flange attached to the inside of a cylindrical casing of the female element, which especially exhibits symmetry in both circumferential directions; and
- the runway paths have straight director lines parallel to the axis of the female element.

BRIEF DESCRIPTION OF THE DRAWINGS

Embodiments of the invention will now be is described with respect to the appended drawings, in which:

FIGS. 6 and 7 represent another variation of the present invention, wherein FIG. 7 is taken along lines VII—VII of FIG. 6, and FIG. 6 is taken along lines VI—VI of FIG. 7.

DETAILED DESCRIPTION OF THE PREFERRED EMBODIMENTS

Figure 1:
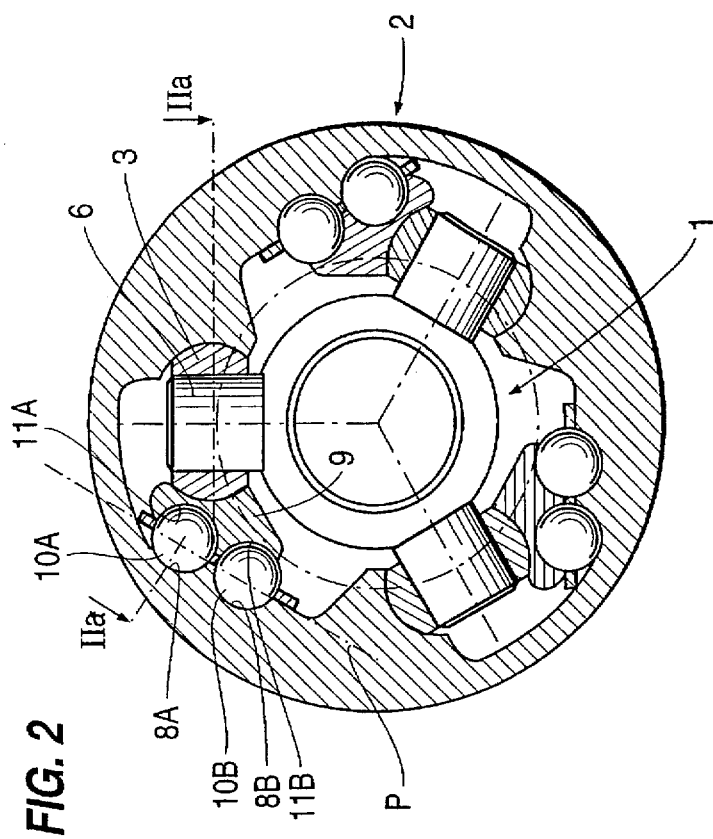
FIG. 1 represents diagrammatically, in transverse section, a universal joint in accordance with the invention.

The universal joint represented in FIG. 1 is intended to connect two shafts (not represented) which can slide with respect to each other, either in mutual alignment or at an angle of discontinuity which may typically reach approximately 25°. It essentially comprises a male element or tripod 1, a female element or jaw 2, three spherical rollers 3 and three anti-vibration assemblies 4.

The tripod is made as a single piece and comprises a central hub 5 designed to be secured to one of the two shafts and from which three arms 6, spaced at angles of 120°, project radially. Each arm is cylindrical with circular cross-section and bears an externally spherical roller 3 mounted so that it can rotate and slide on the arm.

The jaw 2 defines, for each arm 6, a pair of facing runway paths. A first runway path 7 consists of a cylindrical slot with a circular cross-section with an of axis parallel to axis X—X of the jaw, substantially matching the spherical roller 3. A second runway path 8 also consists of a cylindrical slot with an axis parallel to the axis X—X, with a circular cross-section but a smaller radius.

The assembly 4 is as described in the aforementioned FR-A-2,628,803. It consists of a self-centering strip 9 and of two balls 10. The strip 9 internally includes a spherical recess which substantially matches the spherical roller interacting with it and externally includes two runway tracks 11 with circular cross-sections which are separated by a middle projection (not visible in the drawing). The tracks 11, viewed in plan, are straight and in the extension of one another. Viewed from the side, they diverge progressively from the runway path 8, starting from the middle projection.

Each ball 10 is interposed between one of these tracks and the runway path 8, and the shape of the two tracks ensures self-recentering of the two balls, as described in the aforementioned FR-A-2,628,803. The assembly 4 is supplemented by a cage 12 for retaining the balls.

In service, the joint is mounted in a motorvehicle transmission in such a manner that, in a forwards gear, the engine torque is transmitted from the tripod to the jaw via the three assemblies 4. Under torque, a slight clearance arises on the side of the paths 7, so that the resistance to sliding is practically that defined by the assemblies 4 and is therefore very low, even at an angle. In other words, in a forwards gear, that is to say for almost all of the operating life of the joint, the level of axial excitations transmitted by the joint to the structure of the vehicle is particularly low.

In reverse gear, it is the resistance to running of these spherical rollers 3 along the paths 7 which defines the resistance to sliding of the joint. This resistance is obviously greater than that corresponding to a forward gear, but is acceptable given the very short time for which the vehicle operates in reverse gear.

It should be noted, on the one hand, that the joint is more simple and more economical than the one described in the aforementioned FR-A-2,628,803, and on the other hand that the discontinuity of the joint does not mean that there will be play around the spherical rollers because these are mounted so that they can slide on the arms 6 and are positioned axially by the runway paths 7.

Figure 2:
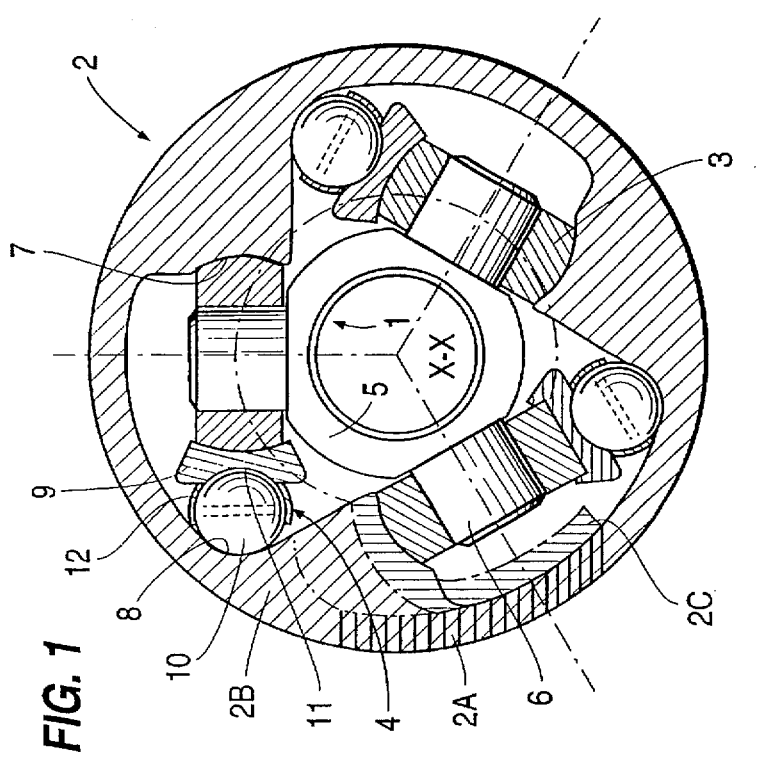
FIG. 2 is a similar view of a first alternative.
Figure 2A:
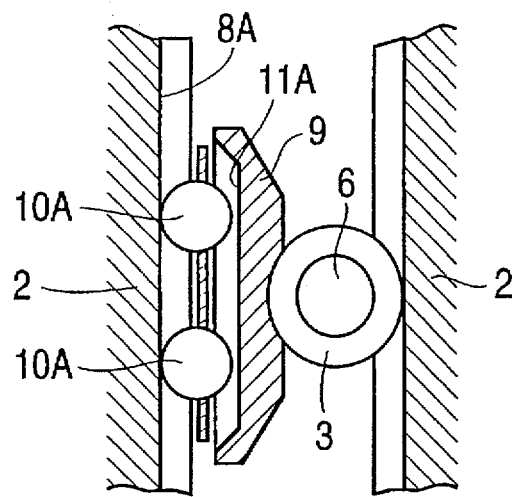
FIG. 2a is a cross-section taken along lines IIa—IIa of FIG. 2.
Figure 3:
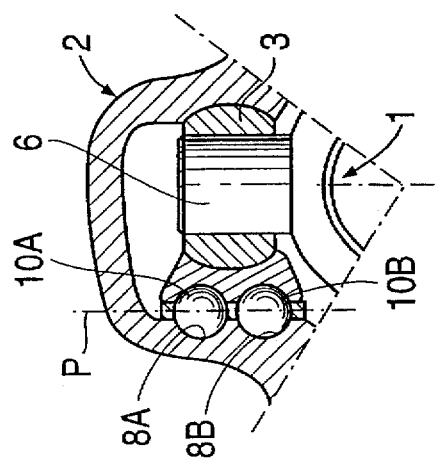

The alternatives of FIGS. 2 and 3 differ from the preceding one only in terms of the following points. On the one hand, the runway path opposite the path 7 consists of two elemental paths 8A, 8B parallel to the axis X—X, and which have the same circular cross-section, which is smaller by comparison with the configuration of FIG. 1. Likewise, each track in the strip 9 consists of two elemental tracks 11A, 11B which are parallel and straight and have the same circular cross-section corresponding to that of the paths 8A and 8B. What is more, two pairs of balls 10A, 10B, having substantially the same radius as these paths and these tracks, are interposed respectively between the path 3 8A and 8B and the tracks 11A and 11B. These duplications make it possible to stabilize the strip 9 and hence the spherical roller.

In the alternative of FIG. 2, the four balls have a common diametral plane P which is inclined with respect to the axis Y—Y of the spherical roller, whereas in the alternative of FIG. 3, the plane P is parallel to this axis.

Figure 4:
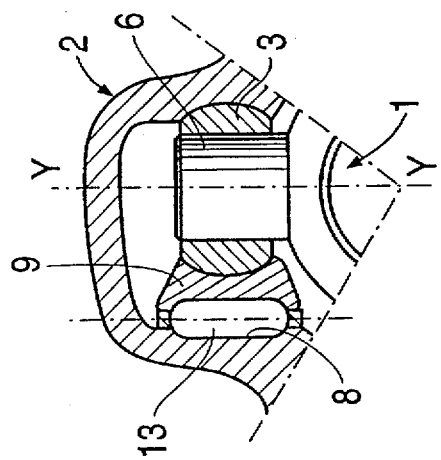

In the alternative of FIG. 4, the two balls 10 of FIG. 1 are replaced by two cylindrical rollers 13 with hemispherical ends, with axes parallel to the axis Y—Y. The surfaces 8,11 of the jaw and of the strip which interact with these rollers have a matching shape, that is to say plane with rounded edges. A self-recentering effect of the rollers is obtained as in FIG. 1.

Figure 5:
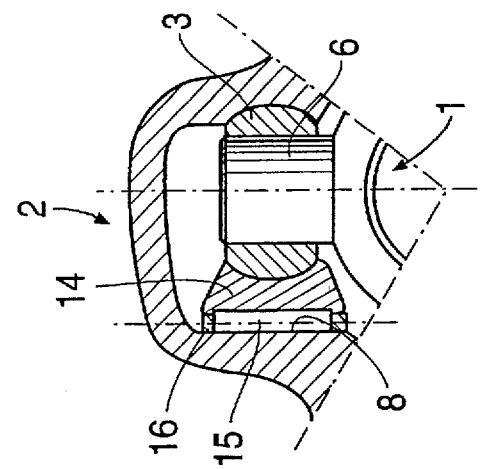
FIGS. 3 to 5 represent diagrammatically, in transverse section, one third of universal joints according to three other variations, respectively.

In the alternative of FIG. 5, the strip 9 is replaced by a pad 14 which is spherical on the inside and plane on the outside, and the runway path 8 consists of a slot with a flat bottom, with an axis parallel to the axis X—X. The pad 14 runs along the axis X—X, on this bottom, by means of a row of needles 15 with axes parallel to the axis Y—Y, retained by a cage 16. The layout of such an assembly 4 is described, for example, in the aforementioned FR-A-2,506,872.

In another alternative which has not been represented, the anti-vibration assembly 4 is a toric segment the internal surface of which interacts with the spherical roller 3 and the external surface of which runs along the path 8 which has a circular cross-section substantially matching that of this external surface.

As an alternative, as indicated in chain line in FIG. 1, the female element 2 may be produced in several pieces, as follows: the starting point is a cylindrical casing 2A internally including three longitudinal projections 2B. Each projection 2B on one side defines a path 8 and on the other a surface symmetric with this path. Fixed into the casing 2A are three metal sheets or flanges 2C, part of which matches the casing and is fixed thereto by welding and the other part of which, curved towards the axis X—X, defines a runway path 7. It is thus easier to manufacture the jaw 2, especially because of the circumferential symmetry of the casing 2A and the option of choosing the direction in which the flanges 2C are fitted.

Figure 6:
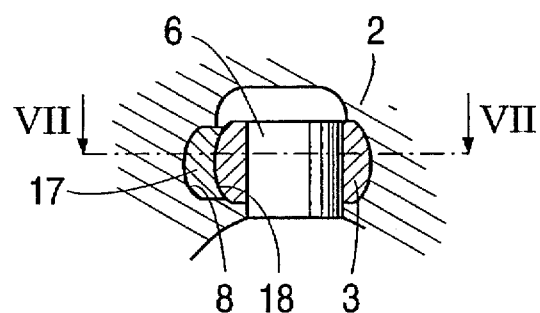
Figure 7:
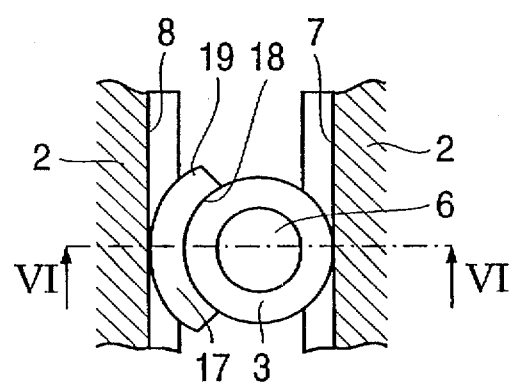

In another alternative represented in FIGS. 6 and 7, the anti-vibration assembly is a toric segment 17, the internal surface 18 of which interacts with the spherical roller 3 and the external surface 19 of which runs along the path 8, which has a circular cross-section substantially matching that of the external surface 19.

I claim:

1. A sliding universal joint, comprising:

a male element intended to be fixed to a first shaft comprising a plurality of arms each having a spherical roller rotatable and slidably mounted thereon, and each said spherical roller having a spherical external surface;

a female element intended to be fixed to a second shaft, said female element defining two runway paths for each said spherical roller such that said two runway paths are located on opposite sides of said spherical roller, said two runway paths of each said spherical roller comprising: a first runway path that directly engages said spherical roller and axially positions said spherical roller; and a second runway path; and an anti-vibration assembly interposed between each said spherical roller and a respective said second runway path, said anti-vibration assembly having a spherical inside surface that substantially matches with and interacts with said spherical external surface of said spherical roller and said anti-vibration assembly being movable along said second runway path.

2. The sliding universal joint of claim 1, wherein said anti-vibration assembly comprises a bearing member having an external face opposite said inside surface and rolling members interposed between said external face of said bearing member and said second runway path.

3. The sliding universal joint of claim 2, wherein said second runway path has a circular cross-section, said bearing member comprises a strip member having at least one track having a circular cross-section in said external face, and said rolling members comprise at least two balls that roll along said at least one track and along said second runway path.

4. The sliding universal joint of claim 3, wherein said strip member comprises a self-centering strip member.

5. The sliding universal joint of claim 2, wherein said second runway path comprises at least two parallel grooves each having a circular cross-section, said bearing member comprises a strip member having at least two tracks each having a circular cross-section in said external face, and said rolling members comprise at least two pairs of balls that run along respective said tracks and along respective said parallel grooves.

6. The sliding universal joint of claim 5, wherein said strip member comprises a self-centering strip member.

7. The sliding universal joint of claim 5, wherein each said spherical roller has a sliding axis, and wherein said at least two pairs of balls have a common diametral plane that is positioned at a position selected from the group consisting of inclined with respect to said sliding axis and parallel with respect to said sliding axis.

8. The universal joint of claim 2, wherein each said spherical roller has a sliding axis, said rolling members comprise cylindrical rollers that have axes parallel to the sliding axis of the respective said spherical roller, said bearing member comprises a strip member having at least one track thereon in said external face, and said at least one track and said second runway path have cross-sections that substantially match the external shape of said rollers.

9. The sliding universal joint of claim 8, wherein said strip member comprises a self-centering strip member.

10. The universal joint of claim 2, wherein said bearing member comprises a pad that is plane on a side thereof opposite from said spherical roller, said second runway path has a flat bottom and said rolling member comprises a row of needles.

11. The universal joint of claim 1, wherein said anti-vibration assembly comprises a toric segment having an internal surface that engages said spherical roller and an external surface that runs along said second runway path, said second runway path having a circular cross-section substantially matching the cross-section of said external surface of said toric segment.

12. The universal joint of claim 1, wherein said female element comprises a cylindrical casing having an inside, said first runway path is defined by an arched flange attached to the inside of said cylindrical casing.

13. The universal joint of claim 1, wherein said female element has a general axis and said runway paths have straight director lines parallel to said general axis.

14. The universal joint of claim 1, wherein said male element comprises a tripod.

* * * * *